(12) United States Patent
Jeon et al.

(10) Patent No.: US 10,705,894 B2
(45) Date of Patent: Jul. 7, 2020

(54) ELECTRONIC DEVICE FOR AUTHENTICATING APPLICATION AND OPERATING METHOD THEREOF

(71) Applicant: Samsung Electronics Co., Ltd., Suwon-si, Gyeonggi-do (KR)

(72) Inventors: Sang-Hoon Jeon, Hwaseong-si (KR); Hyungsup Kim, Hwaseong-si (KR); Wonjae Lee, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 226 days.

(21) Appl. No.: 15/608,592

(22) Filed: May 30, 2017

(65) Prior Publication Data

US 2017/0344407 A1 Nov. 30, 2017

(30) Foreign Application Priority Data

May 30, 2016 (KR) .................. 10-2016-0066480
Oct. 7, 2016 (KR) .................. 10-2016-0130056

(51) Int. Cl.
*G06F 9/54* (2006.01)
*H04L 9/32* (2006.01)
(Continued)

(52) U.S. Cl.
CPC .............. *G06F 9/545* (2013.01); *G06F 21/44* (2013.01); *G06F 21/74* (2013.01); *H04L 9/3242* (2013.01);
(Continued)

(58) Field of Classification Search
CPC .......... G06F 21/30; G06F 21/44; G06F 21/57; G06F 21/572; G06F 21/575; G06F 21/70;
(Continued)

(56) References Cited

U.S. PATENT DOCUMENTS 6,694,434 B1 * 2/2004 McGee ................. G06F 21/565
713/182
7,679,133 B2 3/2010 Son et al.
(Continued)

FOREIGN PATENT DOCUMENTS

KR 10-1502999 3/2015
KR 10-2016-0000875 1/2016
KR 10-2016-0005566 1/2016

OTHER PUBLICATIONS

Andrew White, Identifying the Unknown in User Space Memory, Oct. 2013, Queensland University of Technology, pp. 1-176 (Year: 2013).*
(Continued)

*Primary Examiner* — Jung W Kim
*Assistant Examiner* — Adrian Stoica
(74) *Attorney, Agent, or Firm* — Myers Bigel, P.A.

(57) ABSTRACT

A method for operating an electronic device is provided. The method includes generating, by an authentication agent, a digital fingerprint of an application, transmitting, by an authentication agent, the generated digital fingerprint to a trusted application on a trusted execution environment (TEE), verifying, by the trusted application, the digital fingerprint, and permitting, by the trusted application, the application to access a secure storage, when the trusted application succeeds in verifying the digital fingerprint.

20 Claims, 13 Drawing Sheets

(51) Int. Cl.
  *G06F 21/74* (2013.01)
  *G06F 21/44* (2013.01)
(52) U.S. Cl.
  CPC ...... *H04L 9/3297* (2013.01); *H04L 2209/127* (2013.01)
(58) Field of Classification Search
  CPC .......... G06F 21/71; G06F 21/74; G06F 21/77; G06F 21/78; G06F 21/79; G06F 21/80; G06F 21/82; G06F 9/46; G06F 9/468; G06F 9/54; G06F 9/545; G06F 9/547; H04L 9/32; H04L 9/3236; H04L 9/3242; H04L 9/3247; H04L 9/3297
  See application file for complete search history.

(56) References Cited

U.S. PATENT DOCUMENTS

| | | | |
|---|---|---|---|
| 7,801,262 B2 | 9/2010 | Wallberg et al. | |
| 8,085,066 B2 | 12/2011 | Brodt et al. | |
| 8,248,106 B1 | 8/2012 | Cohen et al. | |
| 8,553,466 B2 | 10/2013 | Han et al. | |
| 8,559,235 B2 | 10/2013 | Yoon et al. | |
| 8,654,587 B2 | 2/2014 | Yoon et al. | |
| 9,036,755 B2 | 5/2015 | Xiu | |
| 9,177,153 B1 | 11/2015 | Perrig et al. | |
| 9,363,071 B2 | 6/2016 | Sengoku et al. | |
| 9,441,524 B2 | 8/2016 | O'Hare et al. | |
| 2009/0086868 A1 | 4/2009 | Shiraishi et al. | |
| 2011/0233648 A1 | 9/2011 | Seol et al. | |
| 2012/0331563 A1* | 12/2012 | Chaudhury | G06F 21/6218 726/27 |
| 2013/0241759 A1 | 9/2013 | Wiley et al. | |
| 2014/0286466 A1 | 9/2014 | Sengoku et al. | |
| 2014/0289833 A1 | 9/2014 | Briceno et al. | |
| 2014/0317400 A1* | 10/2014 | Slodki | G06F 21/121 713/155 |
| 2015/0201052 A1 | 7/2015 | Li et al. | |
| 2015/0278820 A1* | 10/2015 | Meadows | G06Q 20/40145 705/64 |
| 2015/0348026 A1* | 12/2015 | Roberts | G06Q 20/10 705/71 |
| 2015/0381369 A1 | 12/2015 | Broumas et al. | |
| 2017/0364685 A1* | 12/2017 | Shah | G06F 21/53 |

OTHER PUBLICATIONS

Coombs "Securing the Future of Authentication with ARM TrustZone-based Trusted Execution and Fast Identity Online (FIDO)" *ARM White Paper* (7 pages) (May 25, 2015).

Frosch et al. "How Secure is TextSecure?" 2016 *IEEE European Symposium on Security and Privacy (EuroS&P)* (17 pages) (Mar. 21-24, 2016).

Goswami "Chapter 3: Public-Key Cryptography and Message Authentication" *Network Security Essentials Applications and Standards Third Edition by William Stallings* (71 pages) (Aug. 2012).

Zhang et al. "Fingerprints on Mobile Devices: Abusing and Leaking" *Black Hat Conference* (11 pages) (Aug. 7, 2015).

Zhao et al. "Providing Root of Trust for ARM TrustZone using On-Chip SRAM" *Proceedings of the 4th International Workshop on Trustworthy Embedded Devices* (13 pages) (Nov. 3, 2014).

* cited by examiner

ELECTRONIC DEVICE FOR AUTHENTICATING APPLICATION AND OPERATING METHOD THEREOF

CROSS-REFERENCE TO RELATED APPLICATIONS

This U.S. non-provisional patent application claims priority under 35 U.S.C. § 119 to Korean Patent Application Nos. 10-2016-0066480 filed on May 30, 2016, and 10-2016-0130056 filed on Oct. 7, 2016, the entire contents of which are hereby incorporated by reference.

BACKGROUND

Embodiments of the inventive concepts described herein relate to electronic devices for authenticating an application and an operating method thereof.

With the widespread adoption of internet of things (IoT) devices, there may be a trend towards securely storing at least some user data in each IoT device. If an IoT device obtains such data and connects with a device of a malicious user, this can lead to a security incident. Encryption/decryption technologies can be used such that a malicious user may not access data stored in the IoT device. However, IoT devices may fail to securely protect their encryption/decryption keys.

To address such problems, some conventional technologies may securely store a key in a trusted execution environment (TEE) using TrustZone and then store data. However, the corresponding technologies may be vulnerable to a sham attack using malware.

SUMMARY

Embodiments of the inventive concepts provide electronic devices for using a secure storage to securely manage a key for encryption on a trusted execution environment (TEE) and increase security and usability of an Internet of things (IoT) device and a method therefor.

According to some embodiments, a method for operating an electronic device may include generating, by an authentication agent, a digital fingerprint of an application, transmitting, by an authentication agent, the generated digital fingerprint to a trusted application on a trusted execution environment (TEE), verifying, by the trusted application, the digital fingerprint, and permitting, by the trusted application, the application to access a secure storage, when the trusted application succeeds in verifying the digital fingerprint.

According to some embodiments, a method for operating an electronic device may include transmitting, by an application, a request to access a secure storage to an authentication agent, generating, by the authentication agent, a digital fingerprint of the application, transmitting, by the authentication agent, the digital fingerprint of the application to a trusted application, checking, by the trusted application, integrity of the authentication agent, verifying, by the trusted application, the digital fingerprint of the application, if the integrity of the authentication agent is assured, and accessing, by the trusted application, the secure storage based on the request to access the secure storage, if the trusted application succeeds in verifying the digital fingerprint of the application.

According to some embodiments, an electronic device may include a processor and a secure storage. The processor may include an authentication agent configured to generate a run-time digital fingerprint of an application on a rich execution environment (REE), a trusted application configured to check integrity of the authentication agent and verify the run-time digital fingerprint on a run-time basis on a trusted execution environment (TEE), and a secure kernel configured to access the secure storage based on a request of the application, when the trusted application succeeds in verifying the run-time digital fingerprint on the TEE.

According to some embodiments, a method for operating an electronic device may include receiving a request to access a secure storage from an application, generating a run-time digital fingerprint of the application, verifying the run-time digital fingerprint on a run-time basis on a TEE, and permitting the application to access the secure storage, when succeeding in verifying the run-time digital fingerprint.

According to some embodiments, a method for operating an electronic device may include receiving, at a trusted application program executing in a trusted execution environment of a processor, a digital fingerprint corresponding to code of an application program from an authentication agent program outside of the trusted execution environment, for example, in a rich execution environment. The method may further include authenticating, by the trusted application program, the application program based on a comparison of the digital fingerprint thereof with one or more enrolled digital fingerprints associated with a secure storage medium, and permitting, by the trusted application program, access to the secure storage medium responsive to the authenticating of the application program based on the digital fingerprint thereof.

BRIEF DESCRIPTION OF THE DRAWINGS

The above and other features will become apparent from the following description with reference to the following figures, wherein like reference numerals refer to like parts throughout the various figures unless otherwise specified, and wherein.

DETAILED DESCRIPTION

Hereinafter, embodiments of the inventive concepts are described with reference to the accompanying drawings so that this disclosure will be thorough and complete and will fully convey the scope of the inventive concepts to those skilled in the art.

Figure 1:
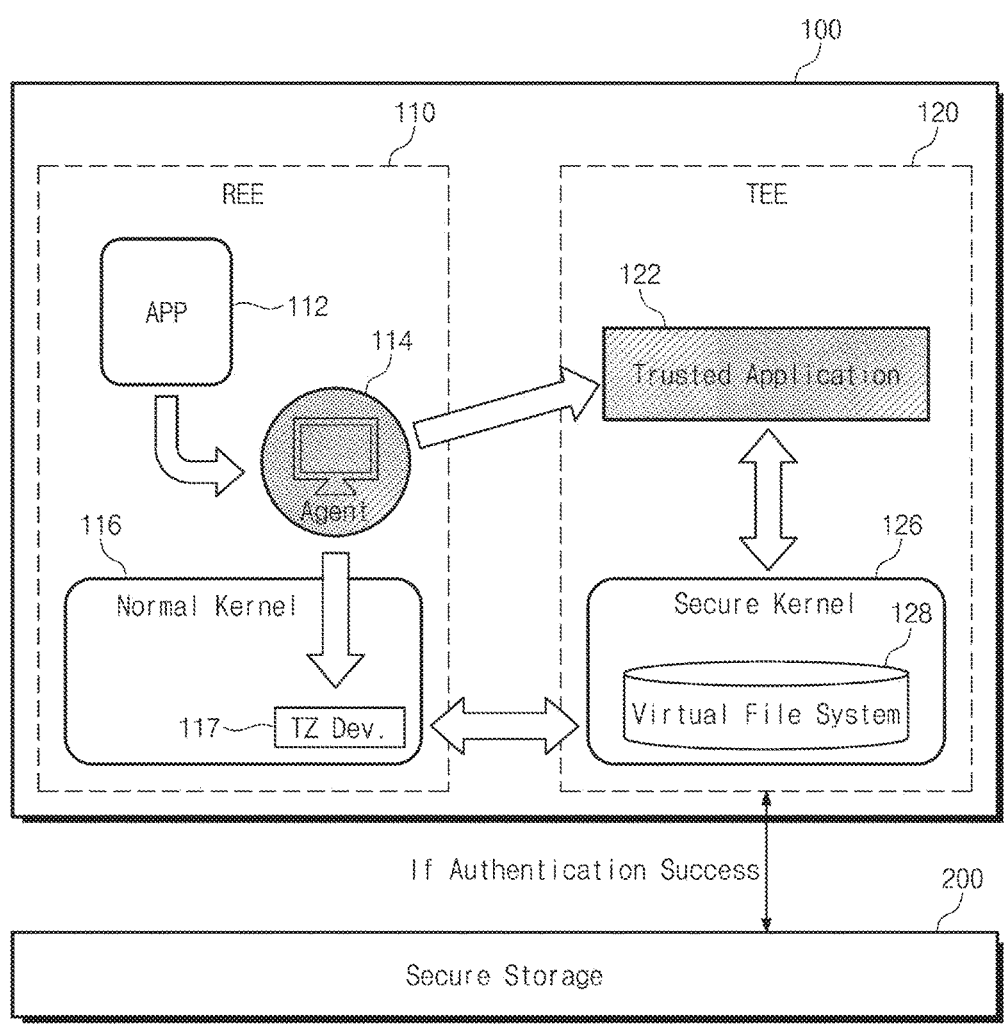
FIG. 1 is a block diagram illustrating a configuration of an electronic device of describing some embodiments of the inventive concepts.

FIG. 1 is a block diagram illustrating a configuration of an electronic device 10 describing some embodiments of the inventive concepts. Referring to FIG. 1, the electronic device 10 may include a processor 100 and a secure storage 200.

The electronic device 10 may include one or more combinations of various devices, for example, a smartphone, a tablet personal computer (PC), a mobile phone, a video telephone, an electronic book (e-book) reader, a desktop PC, a laptop PC, a netbook computer, a personal digital assistant (PDA), a portable multimedia player (PMP), a motion picture experts group (MPEG-1 or MPEG-2) audio layer 3 (MP3) player, a mobile medical device, an electronic bracelet, an electronic necklace, an electronic accessory or appcessory, a camera, a wearable device, an electronic clock, a wrist watch, home appliances (e.g., a refrigerator, an air conditioner, a cleaner, an oven, a microwave oven, a washing machine, an air cleaner, and the like), an artificial intelligence robot, a television (TV), a digital video disk (DVD) player, an audio, various medical devices (e.g., a magnetic resonance angiography (MRA), a magnetic resonance imaging (MRI), a computed tomography (CT), a scanner, an ultrasonic device, and the like), a navigation device, a global positioning system (GPS) receiver, an event data recorder (EDR), a flight data recorder (FDR), a set-top box, a TV box (e.g., Samsung HomeSync™, Apple TV™, or Google TV™), an electronic dictionary, a car infotainment device, electronic equipment for ship (e.g., a navigation system for ship, a gyrocompass, and the like), avionics, a security device, electronic clothes, an electronic key, a camcorder, a game console, an head-mounted display (HMD), a flat panel display device, an electronic picture frame, an electronic album, part of furniture or a building/structure including a communication function, an electronic board, an electronic signature receiving device, or a projector.

Referring again to FIG. 1, the processor 100 may be implemented to control at least one component in an electronic device 10 or execute calculation/data processing about communication. In some embodiments, the processor 100 may include at least one of a central processing unit (CPU), a graphic processing unit (GPU), an application processor (AP), and a communication processor (CP). As shown in FIG. 1, the processor 100 may include a rich execution environment (REE) 110 and a trusted execution environment (TEE) 120.

The REE 110 may be implemented in hardware, software, and/or firmware and may be a platform of providing a normal execution environment. The REE 110 may include at least one application 112, an authentication agent 114, and a normal kernel 116. As used herein, an "application" (such as the application 112, the authentication agent 114, and/or the trusted application 122, also referred to herein as application programs) may refer to computer readable program code stored in a computer readable memory that, when executed by a processor, causes the processor to perform operations specified by the computer readable program code.

The application 112 may be driven or executed on the REE 110 to provide a service to a user of the electronic device 10. If the application 112 wants to securely manage a file via a virtual file system 128 of the TEE 140, it may send a request to process the file to the authentication agent 114. For example, the application 112 may access the secure storage 200 (e.g., write/read a file in/from the secure storage 200) via the authentication agent 114.

The authentication agent 114 may be an interface for encrypting a file via the virtual file system 128 of the TEE 120 and storing/loading/deleting the encrypted file and may call a trusted application (TA) 122. A request of the authentication agent 114 may be received in the trusted application 122 of the TEE 120. The trusted application 122 may call and process a function corresponding to the request of the authentication agent 114 among functions of the virtual file system 128.

Further, the authentication agent 114 may be implemented to assist with an operation of authenticating the application 112 on the TEE 120. The application agent 114 may generate a digital fingerprint of the application 112 and may send the generated digital fingerprint to the trusted application 122. In some embodiments, the digital fingerprint may be generated using a unique value of the application 112, for example, a code value of or corresponding to a code area of the application 112. In some embodiments, the digital fingerprint may be a value in which the code value is encrypted using a variety of methods (e.g., a hash scheme, a symmetric key scheme, an asymmetric key scheme, and the like).

In some embodiments, the authentication agent 114 may generate a digital fingerprint on a periodic basis. In another embodiment, the authentication agent 114 may generate a digital fingerprint on an aperiodic basis. For example, the authentication agent 114 may generate a digital fingerprint in response to a random number.

A normal kernel 116 may be a kernel for executing the at least one application 112 which provides a service to the user on the REE 110. For example, the normal kernel 116 may be an operating system (OS). In some embodiments, the OS may be UNIX, Linux, Android, Android Wear, Symbian OS, Windows OS series, Tizen, or the like. In some embodiments, the normal kernel 116 may be downloaded from a third party after the electronic device 10 is manufactured.

In some embodiments, the normal kernel 116 may support a plurality of OSs. For example, the normal kernel 116 may include a virtual platform (e.g., a hypervisor) which may simultaneously drive the plurality of OSs.

Further, the normal kernel 116 may include a TrustZone driver (TZ Dev.) 117. The TZ Dev. 117 may be a kernel module loaded into the normal kernel 116 and may relay communication among the application 112, the TEE 120, and the authentication agent 114 of the REE 110. For example, the virtual file system 128 of the TEE 120 may provide an interface for storing a file in a file system of the REE 110.

In some embodiments, the TZ Dev. 117 may help the TEE 120 with authentication for the authentication agent 114. In other words, the TZ Dev. 117 may determine tampering with the authentication agent 114 to assure integrity.

In FIG. 1, some embodiments are described by way of example with reference to using the TZ Dev. 117 to check integrity of the authentication agent 114. However, it should be understood that embodiments are not limited thereto. For example, a global platform client application programming interface (API) may be used to check the integrity of the authentication agent 114.

The TEE 120 may be configured with hardware, software, and/or firmware, and may be a secure platform for providing a level or layer of protection from a software attack on the REE 110. The TEE 120 may control access/execution of a sensitive application that may need to be separated from the REE 110, that is, the at least one trusted application 122.

Further, the TEE 120 may include the at least one trusted application 122 and a secure kernel 126.

The trusted application 122 may be a secure application (e.g., a digital rights management (DRM) application, a bank application, a payment application, a cooperate application, and the like) that has greater security needs, driven or executed in the TEE 120. For example, the trusted application 122 may include a preloaded application, a native application, and/or a third party application.

Particularly, the trusted application 122 may determine whether to authenticate an REE client. In some embodiments, the trusted application 122 may enroll and verify a digital fingerprint for authenticating the application 112 in response to a request of the authentication agent 114 of the REE 110.

The secure kernel 126 may drive or control execution of the trusted application 122 on the TEE 120. Since the secure kernel 126 is driven in state where it is protected (physically or by software) from a malicious user, it may be used for security-related tasks and the like, such as key management. The secure kernel 126 may include the virtual file system 128.

If the trusted application 122 calls a file function of the virtual file system 128, the virtual file system 128 may perform a task such as encryption or decryption, and may securely store or load the encrypted or decrypted file in the file system of the REE 110 or may delete the file stored in the file system of the REE 110.

In FIG. 1, some embodiments are described by way of example with reference to the case where the secure kernel 126 includes the virtual file system 128 implemented in the file system of the REE 110. However, embodiments are not limited thereto. For example, it should be understood that the secure kernel 126 may be implemented with a file system independent of the file system of the REE 110.

Further, the secure storage 200 may be implemented to store secure data and/or store encrypted or decrypted data. In some embodiments, the secure storage 200 may be implemented by all or part of a volatile memory device and/or a non-volatile memory device. In some embodiments, the secure storage 200 may be implemented to be accessible via only the TEE 120.

The secure storage 200 may be used in a closed environment (to be available to only previously defined application(s)) or an open environment (to be available to some or all applications). A time when an application is enrolled in the secure storage 200 may be changed based on each of the closed environment and the open environment. The closed environment and the open environment may have the same authentication process after the application is enrolled. In some embodiments, a code hash value of an available application may be enrolled at a time when a trusted application is generated in the closed environment. In some embodiments, in the open environment, if the application 112 requests the secure storage 200 to enroll a hash value of its hash on a run-time basis, the authentication agent 114 of the REE 110 may generate and enroll the hash value of the hash of the application 112.

The electronic device 10 according to some embodiments may perform an operation of authenticating the application 112. The authentication agent 114 of the REE 110 may generate a digital fingerprint by encrypting a reverse code value (e.g., a process identifier (PID)) of a code area of the application 112 using a PID of the application 112 and may send the generated digital fingerprint to the trusted application 122 of the TEE 120. Subsequently, the trusted application 122 may authenticate the application 112 by comparing the sent digital fingerprint with an enrolled digital fingerprint.

The electronic device 10 according to some embodiments may include the authentication agent 114 for managing the right to access the secure storage 200 using digital fingerprint information of the application 112, thus increasing security and usability.

Figure 2:
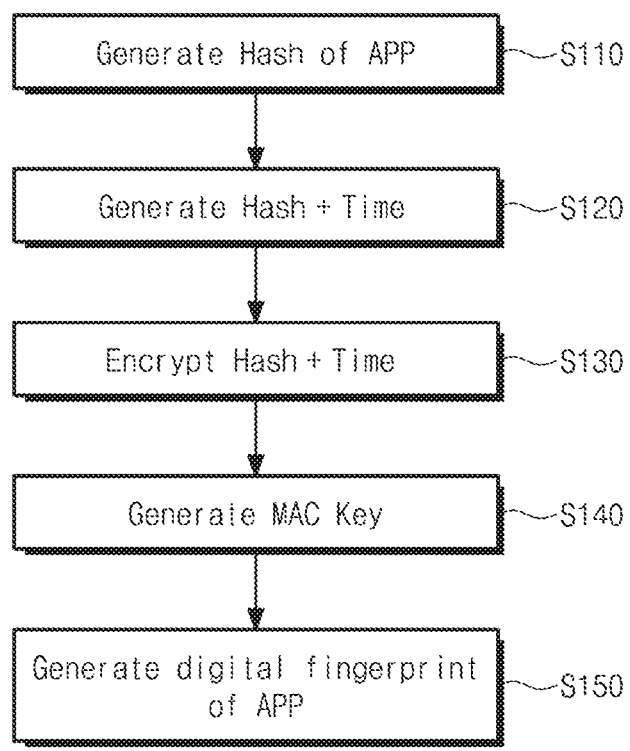
FIG. 2 is a flowchart illustrating a method for generating a digital fingerprint of an application in an electronic device according to some embodiments.

FIG. 2 is a flowchart illustrating a method for generating a digital fingerprint of an application in an electronic device 10 according to some embodiments. Referring to FIG. 2, a process of generating a digital fingerprint of an application is described hereinafter.

In step S110, an authentication agent 114 of FIG. 1 may generate hash data of an application 112 of FIG. 1 by reading data of a code area using a PID transmitted from the application 112 and hashing the read data using a hash algorithm. In step S120, the authentication agent 114 may add timestamp information to the generated hash data.

In step S130, the authentication agent 114 may encrypt the hash data to which the timestamp is added, based on an encryption algorithm (e.g., a symmetric key, an asymmetric key, and the like). In some embodiments, the authentication agent 114 may encrypt the hash data to which the timestamp information is added, using a public key previously transmitted from a trusted application 122. In some embodiments, the authentication agent 114 may encrypt the hash data to which the timestamp information is added, using a secret key shared with the trusted application 122.

In step S140, the authentication agent 114 may generate a message authentication code (MAC) key for integrity of enrolling and transmitting a digital fingerprint. In some embodiments, the MAC key may be generated based on a MAC chaining scheme.

In step S150, the authentication agent 114 may generate a digital fingerprint of the application 112, configured with the encrypted hash data and the MAC key.

In some embodiments, the process of generating the digital fingerprint of the application 112 at the authentication agent 114 may be performed at both of (i) a time when the application 112 is enrolled and (ii) a time when a secure storage 200 of FIG. 1 is used.

The authentication agent 114 according to some embodiments may generate a run-time digital fingerprint by adding the timestamp information to the hash data. However, embodiments are not limited thereto. For example, it should be understood that the digital fingerprint according to some embodiments may not include the timestamp information.

Figure 3:
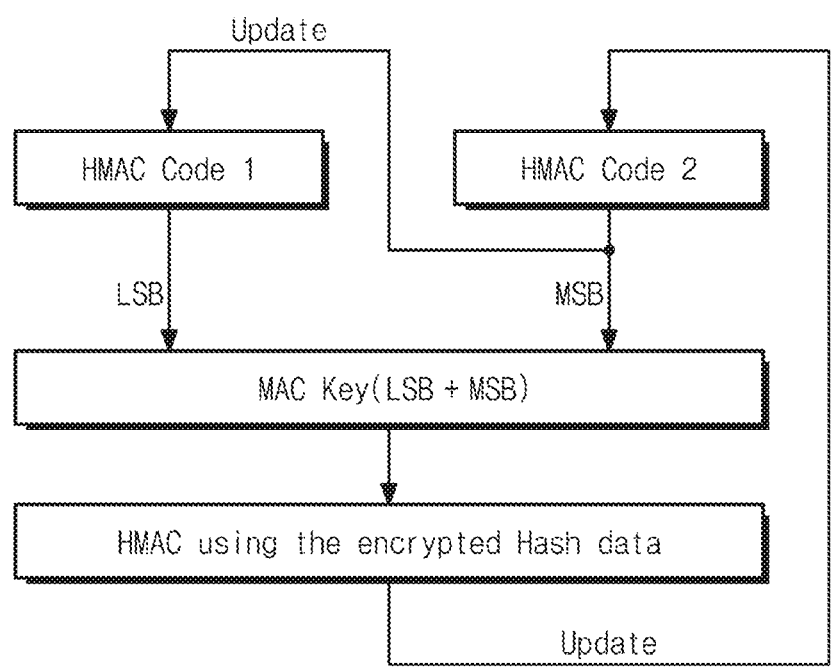
FIG. 3 is a drawing illustrating a process of generating a message authentication (MAC) key according to a MAC chaining scheme in an authentication agent according to some embodiments.

FIG. 3 is a drawing illustrating a process of generating a message authentication (MAC) key according to a MAC chaining scheme in an authentication agent 114 according to some embodiments. Referring to FIG. 3, an initial MAC key may be configured with least significant bits (LSB) and most significant bits (MSB). Herein, the LSB may be a first code value (HMAC code 1), and the MSB may be a second code value (HMAC code 2).

If the initial MAC key is generated, the second code value (HMAC code 2) may be updated to the first code value (HMAC code 1). Subsequently, the authentication agent 114 may generate a hash-based message authentication code (HMAC) value using the hash data that was encrypted in FIG. 2. In other words, the HMAC value may be a value resulting from operations in which the encrypted hash data is hashed by a hash algorithm. The generated HMAC value may be updated to the second code value (HMAC code 2). The authentication agent 114 may generate a MAC key through the above-mentioned process. Simultaneously or in parallel in some embodiments, a trusted application 122 of FIG. 1 may generate a MAC key in the same manner to verify the generated MAC key.

In some embodiments, the first code value (HMAC code 1) and the second code value (HMAC code 2) may be stored and managed in part of a secure storage 200.

Figure 4:
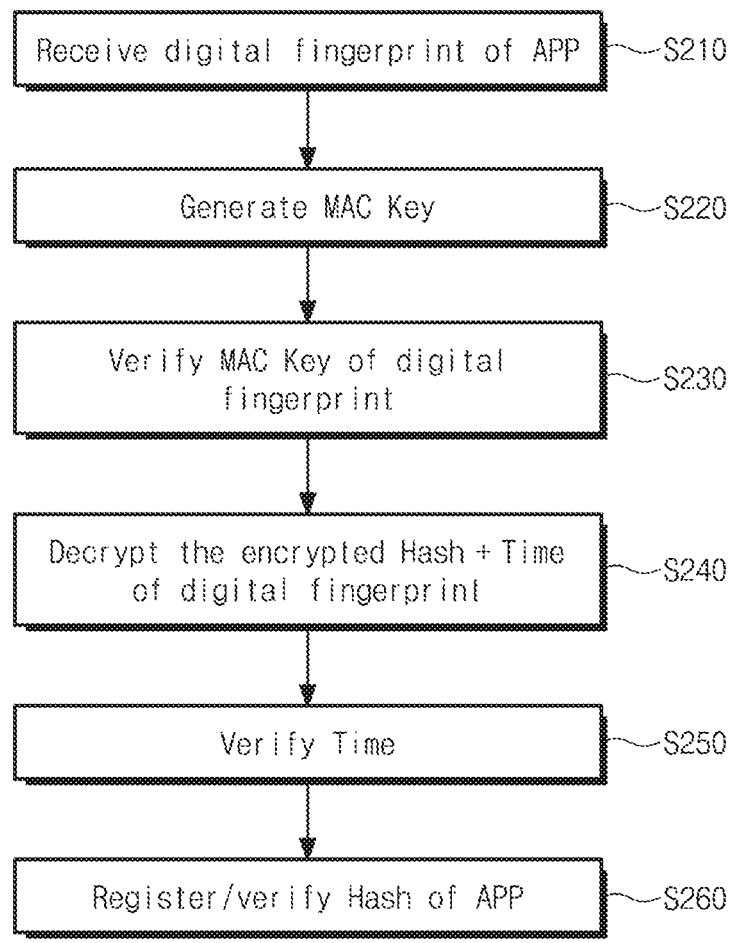
FIG. 4 is a flowchart illustrating a method for enrolling/verifying a digital fingerprint of an application in an electronic device according to some embodiments.

FIG. 4 is a flowchart illustrating a method for enrolling/verifying a digital fingerprint of an application in an electronic device 10 according to some embodiments. Referring to FIG. 4, a method for enrolling and verifying a digital fingerprint of an application is described hereinafter.

In step S210, a trusted application 122 of FIG. 1 may receive a digital fingerprint of an application 112 of FIG. 1 from an authentication agent 114 of FIG. 1. Herein, the received digital fingerprint may include encrypted hash data and a MAC key.

In step S220, the trusted application 122 may generate a MAC key to check integrity of the received digital fingerprint. In some embodiments, the MAC key may be generated by a MAC chaining scheme. In step S230, the trusted application 122 may verify the MAC key of the digital fingerprint by comparing the generated MAC key with the MAC key of the digital fingerprint. If the generated MAC key is identical to the MAC key of the digital fingerprint, the trusted application 122 may determine that the digital fingerprint received from the authentication agent 114 has integrity.

In step S240, the trusted application 122 may decrypt encrypted hash data of the digital fingerprint based on an encryption algorithm. In some embodiments, the trusted application 122 may decrypt encrypted hash data included in the digital fingerprint using a private key of the trusted application 122. In another embodiment, the trusted application 122 may encrypt the encrypted hash data included in the digital fingerprint using a secret key shared with the authentication agent 114.

In step S250, the trusted application 122 may verify timestamp information included in the decrypted hash data. If the timestamp information is present in a predefined time range, the trusted application 122 may determine that the decrypted hash data has integrity.

The trusted application 122 may enroll hash data of the application 112 in the decrypted hash data in a secure storage 200 of FIG. 1. Also, in step S260, the trusted application 122 may authenticate the digital fingerprint of the application 112 by comparing whether the decrypted hash data is the hash data stored in the secure storage 200.

Figure 5:
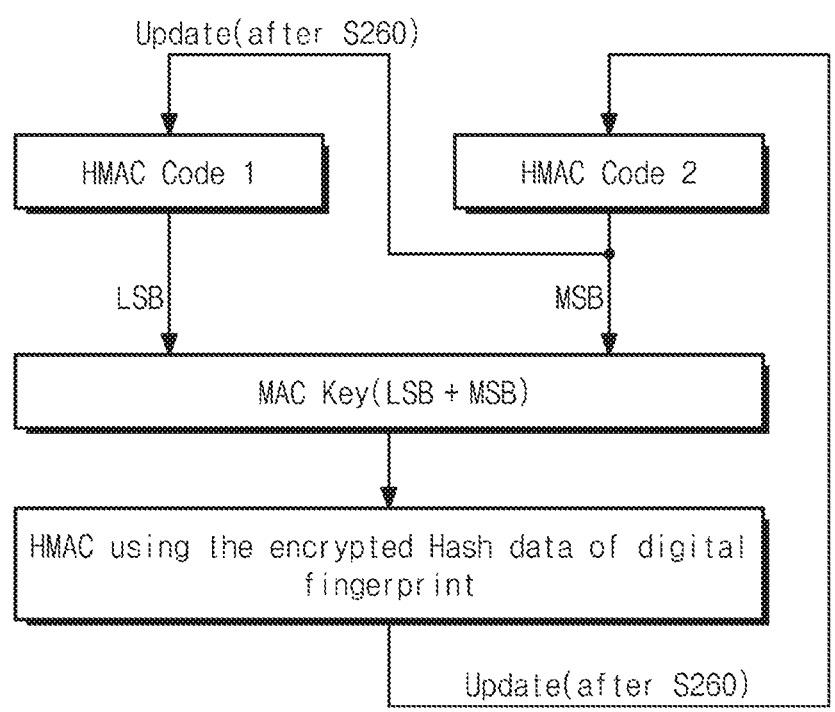
FIG. 5 is a drawing illustrating a process of generating a MAC key according to a MAC chaining scheme in a trusted application according to some embodiments.

FIG. 5 is a drawing illustrating a process of generating a MAC key according to a MAC chaining scheme in a trusted application 122 according to some embodiments. Referring to FIG. 5, a process of generating the MAC key is similar to a process of generating a MAC key, shown in FIG. 3, but is performed after enrolling and verifying a digital fingerprint.

Herein, an HMAC value may be generated using encrypted hash data included in a received digital fingerprint. Also, operations of updating a first code value (HMAC code 1) and a second code value (HMAC code 2) may be performed after step S260 of FIG. 4 (after enrolling and verifying a digital fingerprint).

Meanwhile, an operation of checking integrity of an authentication agent 114 of FIG. 1 may be additionally performed.

Figure 6:
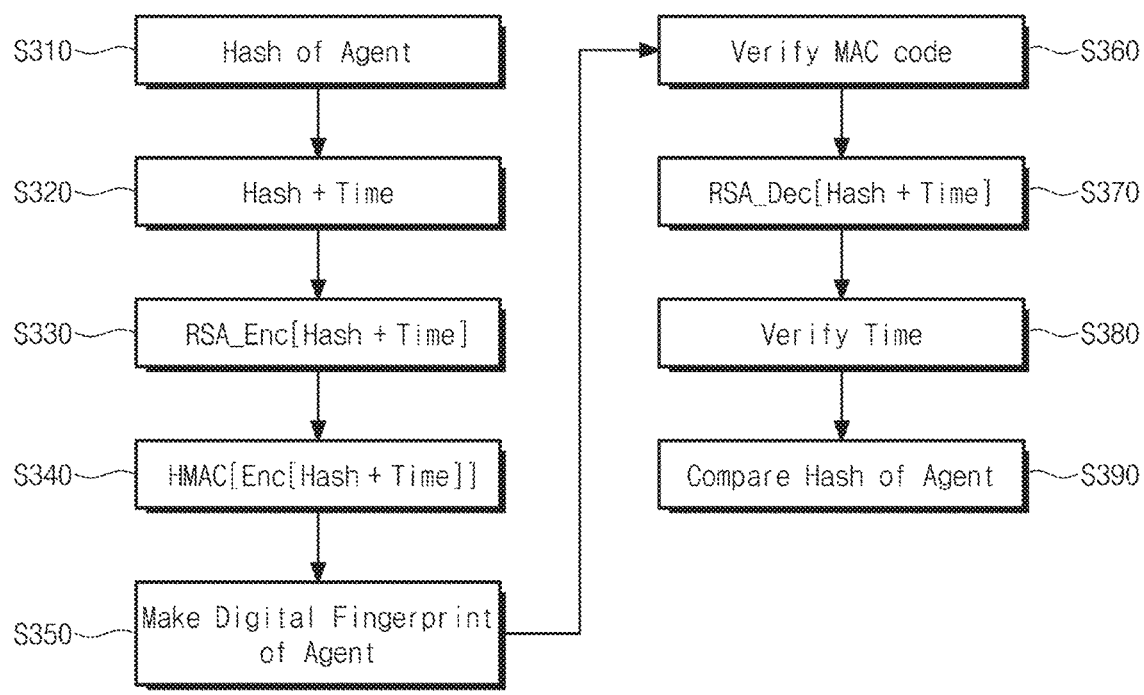
FIG. 6 is a flowchart illustrating an operation of checking integrity of an authentication agent according to some embodiments.

FIG. 6 is a flowchart illustrating an operation of checking integrity of an authentication agent 114 according to some embodiments. Referring to FIG. 6, a TZ Dev. 117 of a normal kernel 116 of FIG. 1 may perform an operation of checking integrity of an authentication agent 114 of FIG. 1 hereinafter. It is assumed that a digital fingerprint of the authentication agent 114 is enrolled in a secure agent 200 of FIG. 2.

In step S310, the TZ Dev. 117 may generate hash data of the authentication agent 114. A secure kernel 126 may assure integrity of the TZ Dev. 117. If tampering occurs or is detected in the TZ Dev. 117, the TZ Dev. 117 may fail to be normally performed. The process of generating the hash data of the authentication agent 114 may be similar to a process of generating hash data of an application 112 of FIG. 1.

In step S320, the TZ Dev. 117 may add timestamp information to the generated hash data. In step S330, the TZ Dev. 117 may perform Rivest Shamir Adelman (RSA) encryption of the hash data and the timestamp information using a public key previously transmitted from a trusted application 122 of FIG. 1.

In step S340, the TZ Dev. 117 may generate an HMAC value of the encrypted hash data (RSA_Enc [Hash+Time]) using the same master key which is promised or provided to the trusted application 122.

In step S350, the TZ Dev. 117 may generate a digital fingerprint of the authentication agent 114, configured with the finally encrypted hash data (RSA_Enc [Hash+Time]) and the HMAC value. The generated digital fingerprint may be sent to the trusted application 122.

The trusted application 122 may generate a MAC value of the encrypted hash data (RSA_Enc[Hash+Time]) using the same master key which is promised or provided to the TZ Dev. 117 to verify a MAC in the digital fingerprint received from the TZ Dev. 117. In step S360, the trusted application 122 may determine whether the generated MAC value is identical to a MAC value received from the TZ Dev. 117.

If the generated MAC value is identical to the MAC value received from the TZ Dev. 117, in step S370, the trusted application 122 may perform RSA decryption of the encrypted hash data (RSA_Enc[Hash+Time]) using its private key.

In step S380, the trusted application 122 may verify the timestamp information in the decrypted hash data. Responsive to success in verifying the timestamp information, in step S390, the trusted application 122 may compare the decrypted hash data with hash data stored or enrolled in the secure storage 200. If the decrypted hash data is identical to the enrolled hash data, the trusted application 122 may determine that the authentication agent 114 has integrity.

Figure 7:
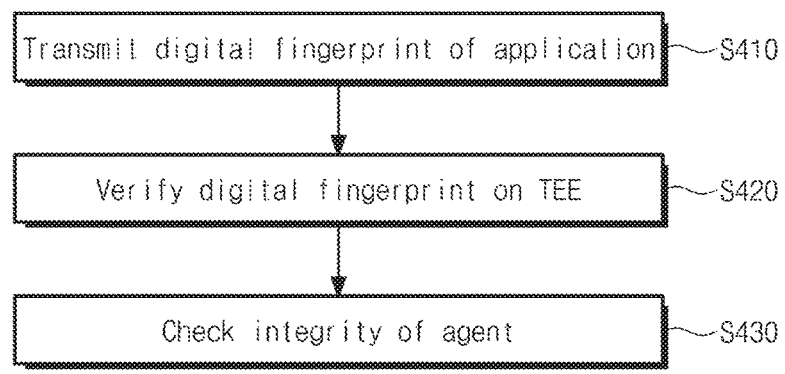
FIG. 7 is a flowchart illustrating a method for authenticating an application in an electronic device according to some embodiments.

FIG. 7 is a flowchart illustrating a method for authentication an application in an electronic device 10 according to some embodiments. Referring to FIGS. 1 to 7, a method for authenticating an application is described hereinafter.

As described with reference to FIG. 2, in step S410, an authentication agent 114 may generate a digital fingerprint of an application 112. As described with reference to FIG. 4, in step S420, a trusted application 122 may verify the digital fingerprint. As described with reference to FIG. 6, in step S430, a TZ Dev. 117 may check integrity of an authentication agent 114.

Figure 8:
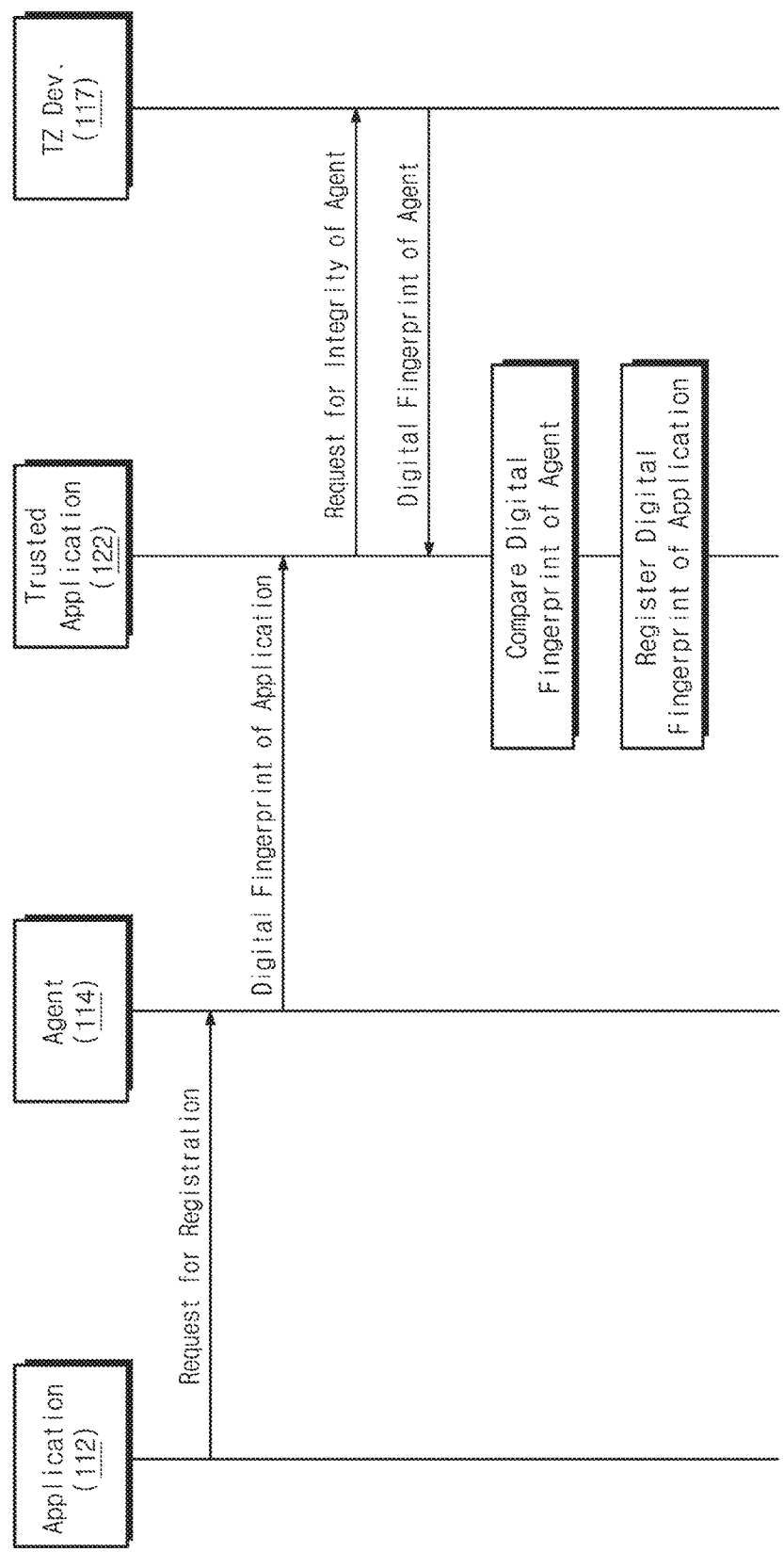
FIG. 8 is a ladder diagram illustrating a process of enrolling an application in an electronic device according to some embodiments.

FIG. 8 is a ladder diagram illustrating a process of enrolling an application in an electronic device 10 according to some embodiments. Referring to FIG. 8, a registration process of an application is described hereinafter.

An application 112 may send a registration request to use a secure storage 200 of FIG. 1 to an authentication agent 114. The authentication agent 114 may generate a digital fingerprint of the application 112 on a real-time basis and may send the generated digital fingerprint to a trusted application 122.

The trusted application 122 may send a request to check integrity of the authentication agent 114 to a TZ Dev. 117. The TZ Dev. 117 may generate a digital fingerprint of the authentication agent 114 in response to the request to check the integrity and may send the generated digital fingerprint of the authentication agent 114 to the trusted application 122.

The trusted application 122 may determine the integrity of the authentication agent 114 by comparing the digital fingerprint sent from the TZ Dev. 117 with a digital fingerprint of the authentication agent 114, previously enrolled in the secure storage 200. If the integrity of the authentication agent 114 is assured, the trusted application 122 may enroll the digital fingerprint of the application 112 in the secure storage 200. That is, the digital fingerprint of the application 112 may be registered and stored for subsequent use in authentication of the application 112.

In some embodiments, a MAC value used upon checking the integrity of the authentication agent 114 may be different from a MAC value used upon checking integrity of the application 112.

In another embodiment, a MAC value used upon checking the integrity of the authentication agent 114 may be the same as a MAC value used upon checking the integrity of the application 112.

Figure 9:
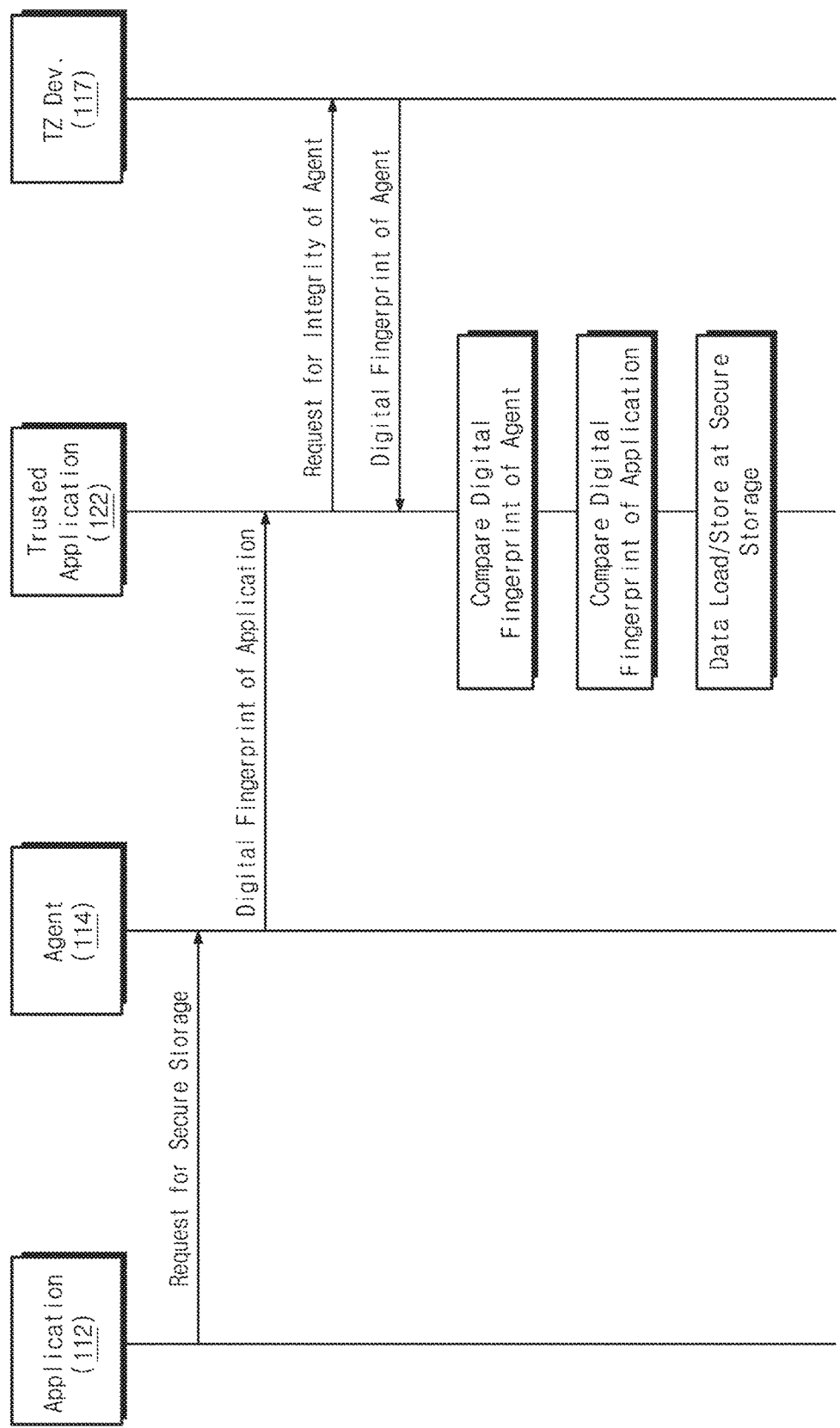
FIG. 9 is a ladder diagram illustrating a process of authenticating an application in an electronic device according to some embodiments.

FIG. 9 is a ladder diagram illustrating a process of authenticating an application in an electronic device according to some embodiments. Referring to FIGS. 1 to 9, a process of authenticating an application is described hereinafter.

An application 112 may send a request to use a secure storage 200 to an authentication agent 114. The authentication agent 114 may generate a digital fingerprint of the application 112 on a real-time basis and may send the generated digital fingerprint to a trusted application 122.

The trusted application 122 may send a request to check integrity of the authentication agent 114 to a TZ Dev. 117. The TZ Dev. 117 may generate a digital fingerprint of the authentication agent 114 in response to the request to check the integrity and may send the generated digital fingerprint of the authentication agent 114 to the trusted application 122.

The trusted application 122 may determine integrity of the authentication agent 114 by comparing the digital fingerprint sent from the TZ Dev. 117 with a digital fingerprint of the authentication agent 114, previously enrolled in the secure storage 200. If the integrity of the authentication agent 114 is assured, the trusted application 122 may determine integrity of the application 112 by comparing the digital fingerprint sent from the authentication agent 114 with a digital fingerprint of the application 112, enrolled in the secure storage 200. If the integrity of the application 112 is assured, the application 112 may access the secure storage 200 via a TEE 120. In other words, the application 112 may load or store data in the secure storage 200 or may delete data from the secure storage 200.

In FIGS. 1 to 9, some embodiments are described by way of example with reference to methods of authenticating the application. However, it should be understood that embodiments are not limited thereto. For example, the authentication method according to some embodiments may be applied to secure booting, as described with reference to FIG. 10.

Figure 10:
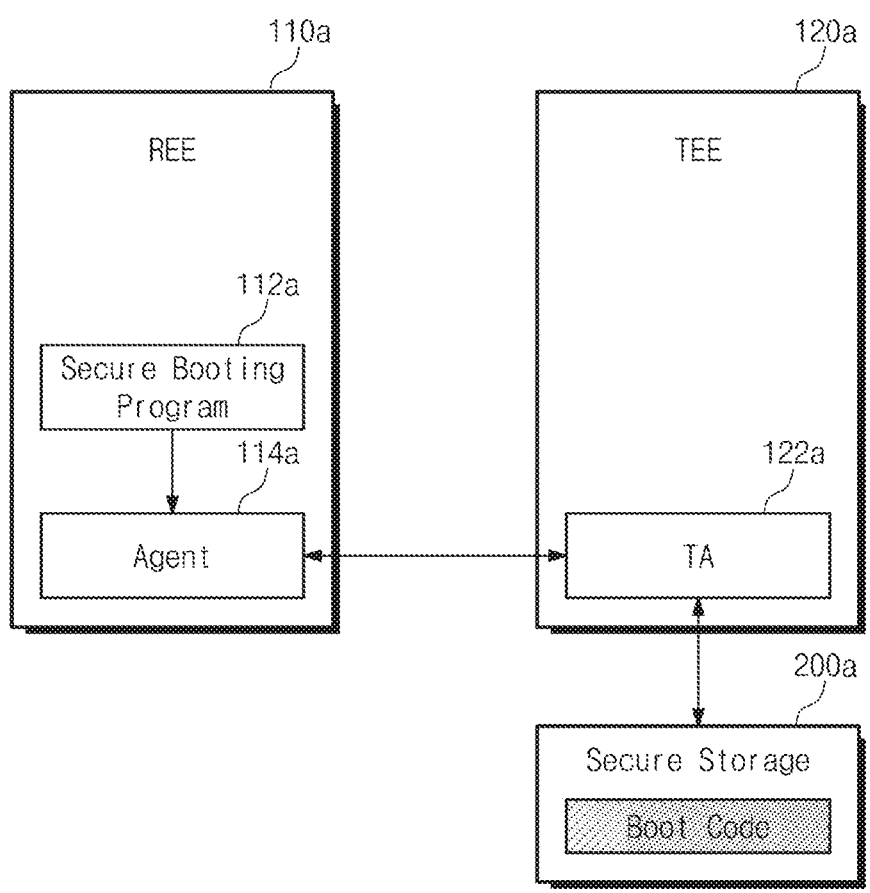
FIG. 10 is a block diagram illustrating a configuration of an electronic device according to another embodiment.

FIG. 10 is a block diagram illustrating a configuration of an electronic device 20 according to another embodiment. Referring to FIG. 10, the electronic device 20 may include an REE 110a, a TEE 120a, and a secure storage 200a.

As described with reference to FIGS. 1 to 9, an authentication agent 114a may enroll and authenticate a digital fingerprint of a secure booting program 112a on a real-time basis.

The secure storage 200a may be implemented to store a boot code. Access to the boot code may be permitted only when the authentication agent 114a succeeds in authenticating the secure booting program 112a.

Figure 11:
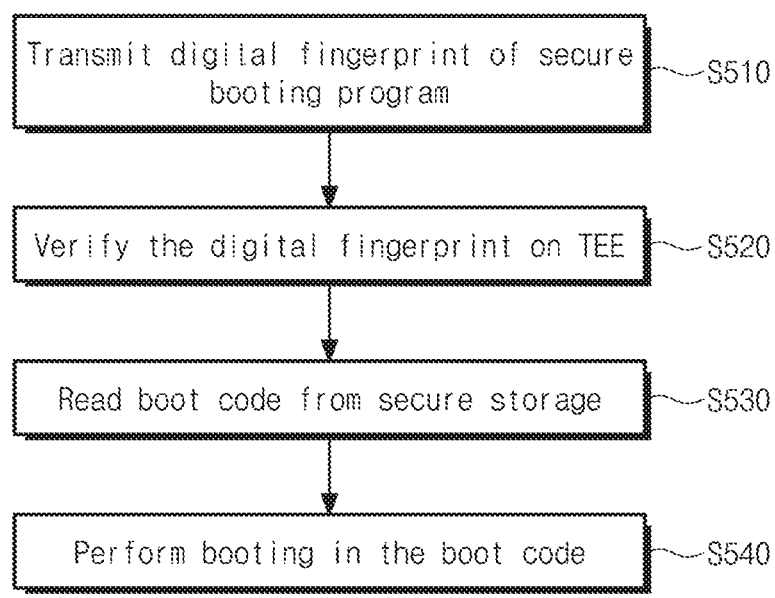
FIG. 11 is a flowchart illustrating a process of performing secure booting in an electronic device shown in FIG. 10.

FIG. 11 is a flowchart illustrating a process of performing secure booting in an electronic device 20 shown in FIG. 10. Referring to FIGS. 10 and 11, secure booting is described hereinafter. It is assumed that a digital fingerprint of a secure booting program is previously enrolled in a secure storage 200a of FIG. 10.

In step S510, an authentication agent 114a may generate a digital fingerprint of a secure booting program 112a and may transmit the generated digital fingerprint to a trusted application (TA) 212a of a TEE 120a. In step S520, the TA 212a of the TEE 120a may determine authentication of the digital fingerprint of the secure booting program 112a on a real-time basis by comparing the transmitted digital fingerprint of the secure booting program 112a with a enrolled digital fingerprint. When the TA 212a succeeds in authenticating the digital fingerprint of the secure booting program 112a, the secure booting program 112a may be granted access to a secure storage 200a. In step S530, the secure booting program 112a may authenticate the digital fingerprint and may read a boot code stored in the secure storage 200a via a TEE 120a. In step S540, the secure booting program 112a may perform booting using the read boot code on an REE 110a.

Meanwhile, according to some embodiments, authentication of an application or program drive on the REE 110a may be interpreted as real-time or run-time authentication on the TEE 120a.

Figure 12:
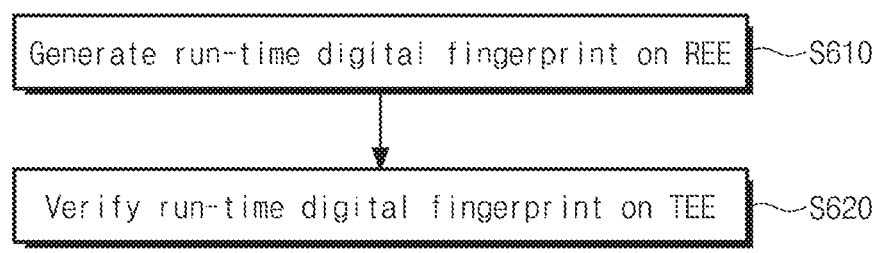
FIG. 12 is a flowchart illustrating an authentication method of an electronic device according to some embodiments.

FIG. 12 is a flowchart illustrating an authentication method of an electronic device according to some embodiments. Referring to FIG. 12, the authentication method of the electronic device is described hereinafter.

In step S610, a digital fingerprint of an application or program may be generated on a run-time basis on an REE. The generated digital fingerprint may be transmitted to a TEE. In step S620, the TEE may verify the transmitted digital fingerprint on a run-time basis.

Meanwhile, a computing system according to some embodiments may be applied to a mobile device.

Figure 13:
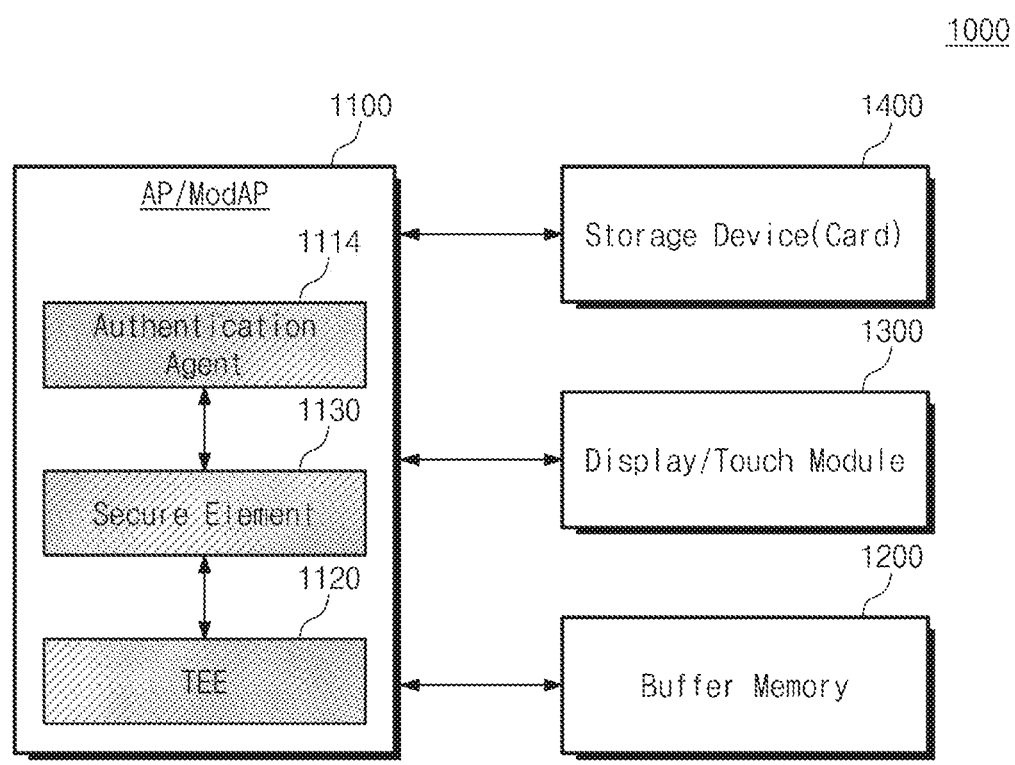
FIG. 13 is a block diagram illustrating a configuration of a mobile device according to some embodiments.

FIG. 13 is a block diagram illustrating a configuration of a mobile device 1000 according to some embodiments. Referring to FIG. 13, the mobile device 1000 may include a processor (AP/ModAP) 1100, a buffer memory 1200, a display/touch module 1300, and a storage device 1400.

The processor 110 may be implemented to control an overall operation of the mobile device 1000 and wired/ wireless communication with the outside (e.g., with an external device). For example, the processor 1100 may be an application processor (AP), a modem application processor (ModAP), or the like.

The processor 1100 may include an authentication agent 1114, a TEE 1120, and a secure chip 1130. As described with reference to FIGS. 1 to 12, the authentication agent 1114 may be implemented to generate and authenticate a run-time digital fingerprint of an application or program.

The secure chip 1130 may be configured with software and/or tamper resistant hardware, may permit high-level security, and may work in cooperation with the TEE 1120 of the processor 1100. For example, the secure chip 1130 may perform an encryption and decryption operation, an operation of generating and verifying a MAC key, and the like performed on TEE 1120.

The secure chip 1130 may include a native operating system (OS), a secure storage device which is an internal data storage, an access control block for controlling the right to access the secure chip 1130, a secure function block for performing ownership management, key management, digital signature, encryption and decryption, and the like, and a firmware update block for updating firmware of the secure chip 1130. The secure chip 1130 may be, for example, a universal IC card (UICC) (e.g., a universal subscriber identity module (USIM), a code division multiple access (CDMA) subscriber identity module (CSIM), and an internet protocol (IP) multimedia services identity module (ISIM)), a subscriber identity module (SIM) card, an embedded secure element (eSE), a microSD, stickers, or the like.

The buffer memory 1200 may be implemented to temporarily store data necessary for an operation of the mobile device 1000. In some embodiments, the buffer memory 1200 may be implemented with a dynamic random access memory (DRAM), a synchronous DRAM (SDRAM), a magnetoresistive RAM (MRAM), or the like. The buffer memory 1200 may include a non-encryption data area and an encryption data area. Herein, the encryption data area may store data encrypted by the secure chip 1130.

The display/touch module 1300 may be implemented to display data processed by the processor 1100 and/or to receive data from a touch panel.

The storage device 1400 may be implemented to store data of a user of the mobile device 1000. The storage device 1400 may be an embedded multimedia card (eMMC), a solid state drive (SSD), a universal flash storage (UFS), or the like. The storage device 1400 may include a secure storage 200 or 200a described with reference to FIGS. 1 to 12.

The storage device 1400 may include at least one non-volatile memory device. The at least one non-volatile memory device may include a NAND flash memory, a vertical NAND (VNAND), a NOR flash memory, a resistive RAM (RRAM), a phase-change RAM (PRAM), an MRAM, a ferroelectric RAM (FRAM), a spin transfer torque RAM (STT-RAM), and the like.

Further, the non-volatile memory device may be implemented with a three-dimensional (3D) array structure. As some embodiments, a 3D memory array may be monolithically formed on one or more physical levels of arrays of memory cells, each of has an active area, disposed on a silicon substrate and a circuit associated with operation of the memory cells. The circuit associated with the operations of the memory cells may be located in or on the substrate. The term "monolithical" may mean that layers of each of levels of the 3D memory array are directly deposited on layers of a lower level of the 3D memory array.

As some embodiments according to some embodiments of the inventive concepts, the 3D memory array may have vertical directionality and may include vertical NAND strings in which at least one memory cell is located on another memory cell. The at least one memory cell may include a charge trap layer. Each of the vertical NAND strings may include at least one selective transistor located on memory cells. The at least one selective transistor may has the same structure as the memory cells and may be monolithically formed with the memory cells.

The 3D memory array may be constructed with a plurality of levels and may have word lines or bit lines shared between the levels. A configuration suitable for the 3D memory array may be used by Samsung Electronics Co., Ltd. and is described by reference documents including U.S. Pat. Nos. 7,679,133, 8,553,466, 8,654,587, 8,559,235, and U.S. Patent Application No. 2011/0233648. A non-volatile memory (NVM) according to some embodiments may be applied to both of a flash memory device in which a charge storage layer is constructed with a conductive floating gate and a charge trap flash (CTF) in which a charge storage layer is constructed with an insulating layer.

The mobile device 1000 according to some embodiments may maintain the entire performance or perform one or more operations described herein, and may increase security or a secure function by performing run-time authentication for an application or program using a unique digital fingerprint.

Figure 14:
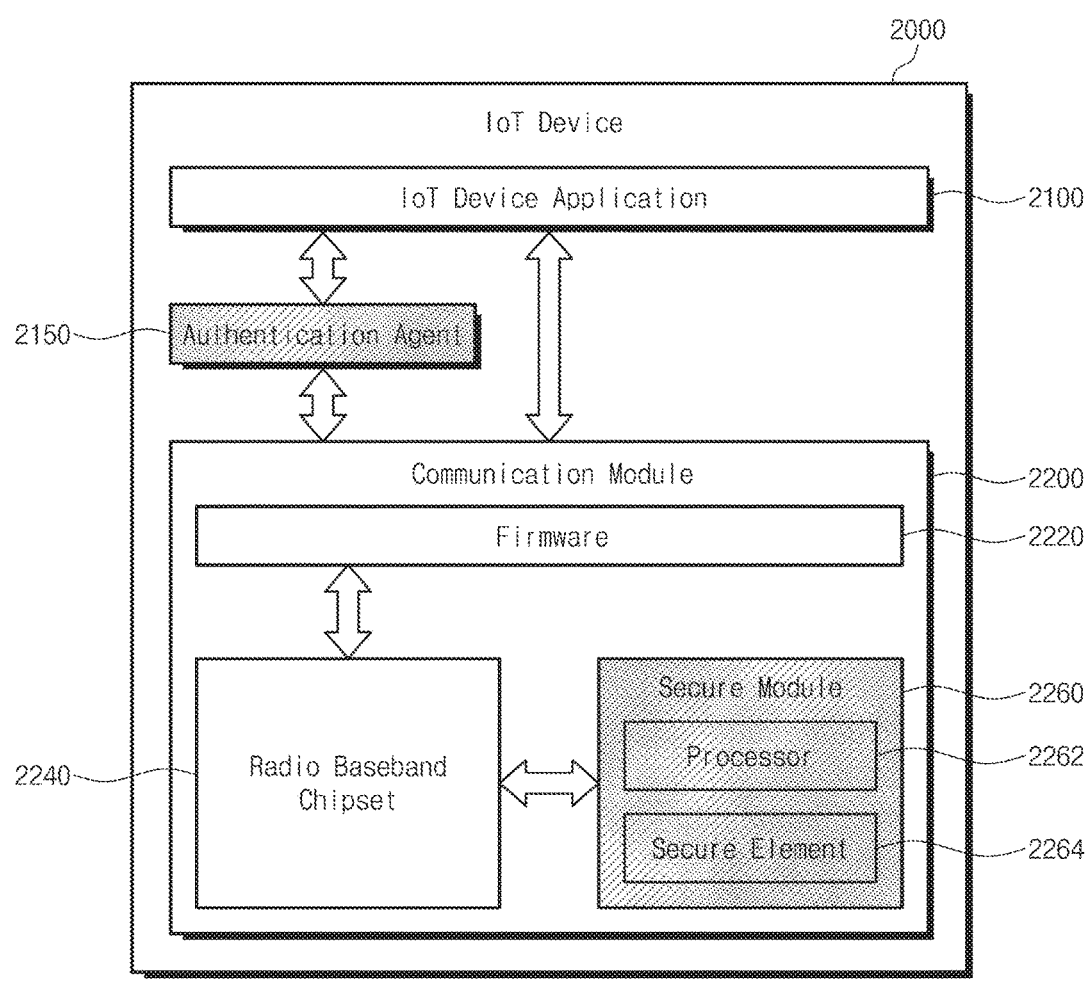
FIG. 14 is a block diagram illustrating a configuration of an IoT device according to some embodiments.

FIG. 14 is a block diagram illustrating a configuration of an IoT device according to some embodiments. Referring to FIG. 14, the IoT device 2000 may include an IoT device application 2100, an authentication agent 2150, and a communication module 2200.

The IoT device application 2100 may be a software component, may control the communication module 2200, and may be executed by a CPU of the IoT device 2000.

As described with reference to FIGS. 1 to 13, the authentication agent 2150 may be implemented to generate, enroll, and verify a digital fingerprint of the IoT device application 2100.

The communication module 2200 may refer to a wireless local area network (WLAN) such as a LAN and wireless-fidelity (Wi-Fi), wireless personal area network (WPAN) such as Bluetooth, a wireless universal serial bus (USB), Zigbee, near field communication (NFC), radio frequency identification (RFID), or a wireless communication component which may be connected with a mobile communication network and may communicate data with the mobile communication network. Also, the communication module 2200 may include firmware 2220, a radio baseband chipset 2240, and a secure module 2260.

The firmware 2220 may provide an application programming interface (API) to the IoT device application 2100 and may control the radio baseband chipset 2240 based on control of the IoT device application 2100. The radio baseband chipset 2240 may provide connectivity to a wireless communication network. The secure module 2260 may include a processor 2262 and a secure element 2264. The secure module 2260 may authenticate the IoT device 2000 to access a wireless communication network and may authenticate the IoT device 2000 for access to a wireless network service.

Figure 15:
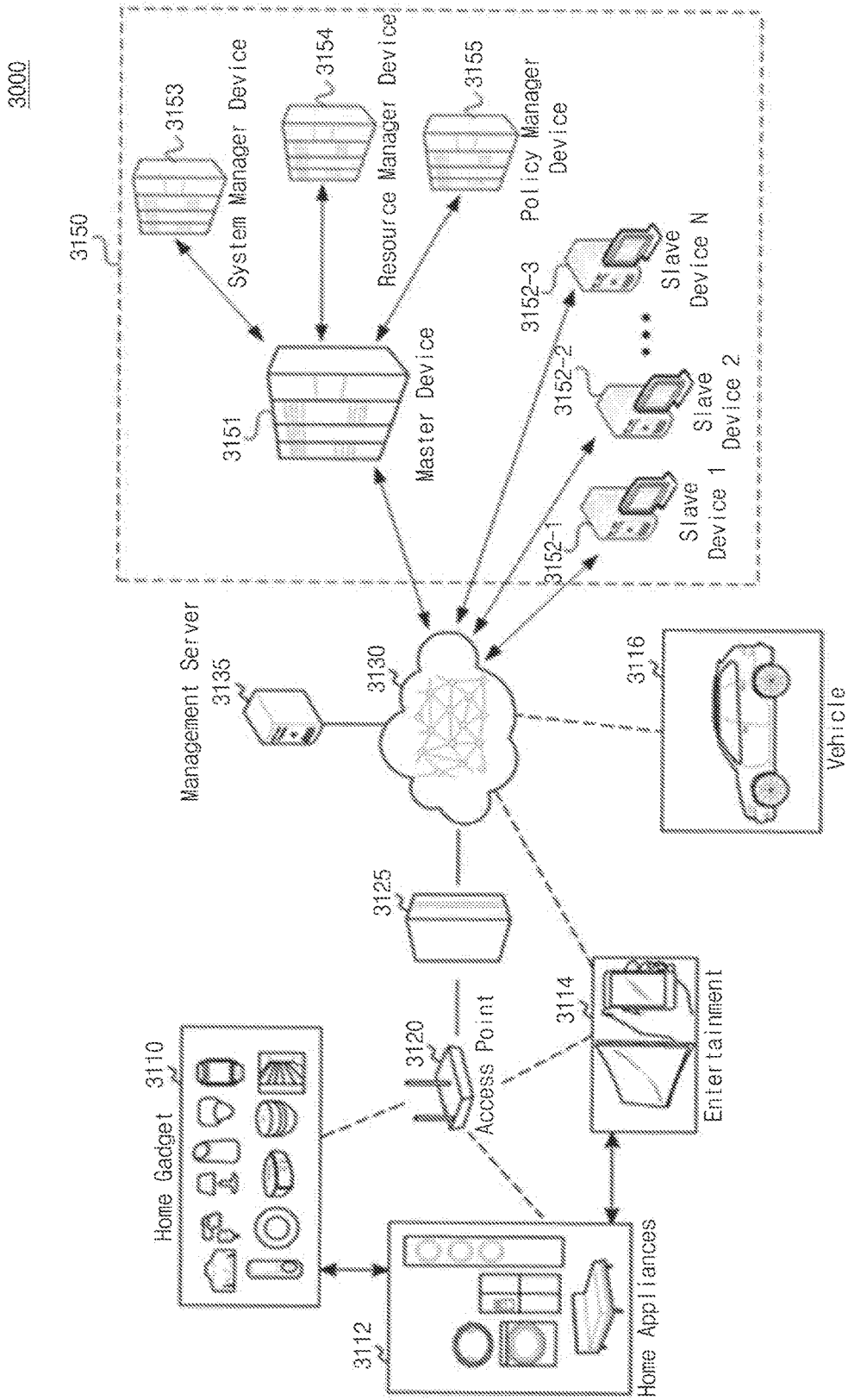
FIG. 15 is a drawing illustrating an IoT system according to some embodiments.

FIG. 15 is a drawing illustrating an IoT system according to some embodiments. Referring to FIG. 15, an IoT network system 3000 may include various components.

An Internet of things (IoT) may refer to a network between things using wired/wireless communication. Thus, an IoT described in the present disclosure may be used as various terms such as an IoT network system, a ubiquitous sensor network (USN) communication system, a machine type communication (MTC) system, a machine oriented communication (MOC) system, a machine to machine (M2M) communication system, or a device to device (D2D) communication system. An IoT network system described in the present disclosure may be configured with an IoT device, an access point (AP), a gateway, a communication network, a server, and the like.

However, such components are classified to describe the IoT network system, but are not intended to limit the scope of the IoT network system. Also, the IoT network system may use a transport protocol (e.g., a user datagram protocol (UDP) or a transmission control protocol (TCP)), an Internet protocol version 6 (IPv6) low-power wireless personal area networks (6LoWPAN) protocol, an IPv6 Internet routing protocol, and an application protocol (e.g., a constrained application protocol (CoAP)), a hypertext transfer protocol (HTTP), a message queue telemetry transport (MQTT) protocol, or an MQTT—for sensors networks (MQTT-S) protocol), for information exchange (communication) between two or more components in the IoT network system.

Each of a plurality of IoT devices 3110, 3112, 3114, and 3116 in a wireless sensor network (WSN) may be used as a sink node or a sensor node. Herein, each of the IoT devices 3110, 3112, 3114, and 3116 may be implemented to authenticate an application or program described with reference to FIGS. 1 to 14 via a digital fingerprint of the application or program. The sink node may be called a base station, may play a role as a gateway for connecting the WSN with an external network (e.g., the Internet), may assign a task to each sensor node, and may gather an event sensed by each sensor node. The sensor node may be a node in the WSN, which may process and gather sensory information and may be a node which may perform communication between nodes connected with each other in the WSN.

The plurality of IoT devices 3110, 3112, 3114, and 3116 may include an active IoT device which operates using its own power and a passive IoT device which operates by power wirelessly supplied from the outside (e.g., from an external device). The active IoT device may include a refrigerator, an air conditioner, a phone, a car, and the like. The passive IoT device may include a radio frequency identification (RFID) tag, an NFC tag, and the like.

In another aspect, each of the IoT devices 3110, 3112, 3114, and 3116 may include a passive communication interface such as a quick response (QR) code, an RFID tag, and an NFC tag, and/or may include an active communication interface such as a modem and a transceiver.

Each of the IoT devices 3110, 3112, 3114, and 3116 may collect data using a sensor and/or may transmit the collected data to the outside (e.g., to an external device) via a wired/wireless communication interface. Also, each of the IoT devices 3110, 3112, 3114, and 3116 may transmit and/or receive control information and/or data via the wired/wireless communication interface. The wired/wireless communication interface may be one of accessible interfaces.

The IoT network system 3000 may include an access point 3120. Each of the plurality of IoT devices 3110, 3112, and 3114 may connect to a communication network or another IoT device via the access point 3120. The access point 3120 may be embedded in one IoT device. For example, the access point 3120 may be embedded in a television (TV). In this case, a user may monitor or control at least one IoT device connected to the access point 3120, through the TV. Also, the access point 3120 may be included in one of IoT devices. For example, a mobile phone may be an IoT device and may be simultaneously the access point 3120 connected to another IoT device. In this case, the mobile phone may connect to a communication network over a mobile communication network or a short-range wireless network.

The IoT network system 3000 may include a gateway 3125. The gateway 3125 may change a protocol to allow the access point 3120 to access an external communication network (e.g., an Internet network or a public communication network). The IoT devices 3110, 3112, and 3114 may connect to an external communication network via the gateway 3125. In some cases, the gateway 3125 may be integrated with the access point 3120. In another case, the access point 3120 may perform a function of a first gateway, and the gateway 315 may perform a function of a second gateway.

The gateway 3125 may be included in one of IoT devices. For example, a mobile phone may be an IoT device and may be simultaneously the gateway 3125 connected to another IoT device. In this case, the mobile phone may connect to a mobile communication network.

The IoT network system 3000 may include at least one communication network 3130. The communication network 3130 may include the Internet and/or a public communication network. The public communication network may include a mobile cellular network. The communication network 3130 may be a channel over which information collected by the IoT devices 3110, 3112, 3114, and/or 3116 is transmitted.

The IoT network system 300 may include a server 3135 connected to the communication network 3130. The communication network 3130 may transmit data sensed by the IoT devices 3110, 3112, 3114, and/or 3116 to the server 3135. The server 3135 may store or analyze the transmitted data. Also, the server 3135 may transmit the analyzed result over the communication network 3130. The server 3135 may store information associated with at least one of the IoT devices 3110, 3112, 3114, or 3116 and may analyze data transmitted from a related IoT device with respect to the stored information. Also, the server 3135 may transmit the analyzed result to a related IoT device or a user device over a communication network. For example, in case of an IoT device which measures a blood sugar level of a user on a run-time basis, the server 3135 may previously store a blood sugar limit preset by the user and may receive the measured blood sugar level over a communication network. In this case, the server 3135 may compare the blood sugar limit with the transmitted blood sugar level and may transmit information indicating whether the user is in danger to the user device and/or the related IoT device.

Each of the IoT devices 3110, 3112, 3114, and 3116 may form a group based on a characteristic of each IoT device. For example, IoT devices may be grouped into the home gadget group 3110, the home appliances/furniture group 3112, the entertainment group 3114, a vehicle group 3116, or the like. Also, the IoT devices may form a temperature control group for controlling an indoor temperature, a large home appliances group or a small home appliances group classified according to a degree of how much power is consumed, a clean group for controlling indoor cleanliness (e.g., air cleaning and floor cleaning), an illumination group for controlling indoor illumination, an entertainment group 3114 for controlling an entertainment device (e.g., a TV, an audio device, and the like). The temperature control group may include an air conditioner, a motorized window, a motorized curtain, and the like. For example, the home gadget group 3110 may include a heart rate sensor patch, a medical device for measuring blood sugar, lighting equipment, a hygrometer, a surveillance camera, a smart watch, a security keypad, a temperature controller, an aroma device, a window blind, and the like. The home appliances/furniture group 3112 may include home appliances such as a robot cleaner, a washing machine, a refrigerator, an air conditioner, and a TV and furniture such as a bed including a sensor. The entertainment group 3114 may include a multimedia device, such as a TV and a smartphone, and a communication device.

Each of the IoT devices may belong to may belong to a plurality of groups. For example, an air conditioner may belong to the home appliances/furniture group 3112 and the temperature control group. A TV may belong to the home appliances/furniture group 3112 and the entertainment group 3114. Also, a smartphone may belong to the home gadget group 3110 and the entertainment group 114.

The IoT network system 3000 may include a distributed server system 3150. The distributed server system 3150 may store or analyze data transmitted from the communication network 3130. Alternatively, the distributed server system 3150 may transmit the stored or analyzed data to other components of the IoT network system 3000 over the communication network 3130.

As some embodiments, the distributed server system 3150 may include a distributed computing system driven based on a distributed file system (DFS). As an example, the distributed server system 3150 may be driven based on one or more of various DFSs such as a hadoop DFS (HDFS), a Google file system (GFS), a cloud store, Coda, a network file system (NFS), and a general parallel file system (GPFS). However, embodiments are not limited thereto.

As some embodiments, the distributed server system 3150 may include a master device 3151, a plurality of slave devices 3152-1 to 3152-3, a system manager device 3153, a resource manager device 3154, and a policy manager device 3155.

Each of the plurality slave devices 3152-1 to 3152-3 may store a data block. As an example, data transmitted over the communication network 3130 may be divided into a plurality of data blocks by the master device 3151. The divided data blocks may be distributed to the plurality of slave devices 3152-1 to 3152-3 to be stored. As an example, if the distributed server system 3150 is driven based on the HDFS, each of the plurality of slave devices 3152-1 to 3152-3 may be a data node and may execute a task tracker for storing a data block.

The master device 3151 may divide data transmitted over the communication network 3130 into a plurality of data blocks. The master device 3151 may provide each of the divided data blocks to at least one of the plurality of slave devices 3152-1 to 3152-3. As an example, if the distributed server system 3150 is driven based on the HDFS, the master device 3151 may be a name node and may execute a job tracker for scheduling the distribution of the divided data blocks. The master device 3151 may manage distribution storage information indicating a storage location of each of the divided data blocks. The master device 3151 may process a request to store data and a request to read data over the communication network 3130.

The system management device 3153 may control and manage overall operations of the distributed server system 3150. The resource manager device 3154 may manage resource usage of components included in the distributed server system 3150. The policy manager device 3155 may manage a policy about access of each of the IoT devices 3110, 3112, 3114, and 3116 over the communication network 3130. As an example, the policy manager device 3155 may determine whether access of each of the IoT devices 3110, 3112, 3114, and 3116 is granted and may manage a billing policy.

Each of the master device 3151, the plurality of slave devices 3152-1 to 3152-3, the system manager device 3153, the resource manager device 3154, and the policy manager device 3155 may include a general purpose computer such as a PC and/or a dedicated computer such as a workstation. Each of the master device 3151, the plurality of slave devices 3152-1 to 3152-3, the system manager device 3153, the resource manager device 3154, and the policy manager device 3155 may include hardware modules for implementing a unique function. Additionally or alternatively, each of the master device 3151, the plurality of slave devices 3152-1 to 3152-3, the system manager device 3153, the resource manager device 3154, and the policy manager device 3155 may implement a unique function by executing software or firmware on a processor core.

As illustrated in FIG. 15, the master device 3151 and the plurality of slave devices 3152-1 to 3152-3 may share the communication network 3130 with the IoT devices 3110, 3112, 3114, and 3116 and may exchange data (or a data block) over the communication network 3130. Alternatively, the master device 3151 may share the communication network 3130 with the IoT devices 3110, 3112, 3114, and 3116, and the plurality of slave devices 3152-1 to 3152-3 may communicate with the master device 3151. The system manager device 3153, the resource manager device 3154, and the policy manager device 3155 may communicate with the master device 3151. On the other hand, in some embodiments, the system manager device 3153, the resource manager device 3154, and the policy manager device 3155 may share the communication network 3130 with the IoT devices 3110, 3112, 3114, and 3116 and may communicate with the master device 3151 over the communication network 3130. Various modifications are possible in some embodiments.

Electronic devices according to some embodiments may securely authenticate an application using fingerprint information of the application, in which it may be more difficult to tamper with data. The authenticated application may securely generate data, may securely store the generated data in a secure storage of a TEE, or may securely delete the stored data from the secure storage of the TEE. Also, a secure storage to which an authentication scheme is applied may be applied to a specific device with weak security to strengthen security. Also, an authentication scheme according to some embodiments may be applied to a secure OS.

According to some embodiments, a key for encryption may be securely managed on the TEE (e.g., using a secure element to prevent a lab attack of obtaining information through a voltage difference, a laser, and the like in hardware) to increase security and usability of an IoT device through an authentication scheme using fingerprint information of an application.

Meanwhile, it should be understood that the inventive concepts are not limited to authentication associated with access to a secure storage. For example, the inventive concepts may be applied to authentication for access to any type of devices.

The authentication methods according to embodiments of the inventive concepts may be implemented with program instructions (also referred to herein as computer readable program code) which may be performed through various computers and may be recorded in computer-readable media. Herein, the media may include program instructions, data files, data structures, and the like. Further, the program instructions recorded in the media may be designed and configured specially for the embodiments of the inventive concepts or be known and available to those skilled in computer software. Further, computer-readable media may include magnetic media such as a hard disk, a floppy disk, and a magnetic tape; optical media such as a compact disk-read only memory (CD-ROM) disks and a digital versatile disc (DVD); magneto-optical media such as optical disks; and hardware such as a read-only memory (ROM), a random access memory (RAM), a flash memory, and the like. Further, program instructions include both machine code, such as produced by a compiler, and higher level code that may be executed by the computer using an interpreter.

The authentication information for using the secure storage may strengthen security according to use of the secure storage by securely authenticating an application using fingerprint information of the application, in which it may be more difficult to tamper with data.

While the inventive concepts has been described with reference to exemplary embodiments, it will be apparent to those skilled in the art that various changes and modifications may be made without departing from the spirit and scope of the inventive concepts. Therefore, it should be understood that the above embodiments are not limiting, but illustrative.

What is claimed is:

1. A method for operating an electronic device, the method comprising:
   generating, by an authentication agent on a rich execution environment (REE) associated with a normal operating system for managing program execution thereon, a digital fingerprint of an application that is on the REE;
   checking, by a driver in the normal operating system, integrity of the authentication agent;
   transmitting, by the authentication agent, the digital fingerprint to a trusted application on a trusted execution environment (TEE), which is associated with a secure operating system for managing program execution thereon, responsive to the generating;
   verifying, by the trusted application, the digital fingerprint; and
   permitting, by the trusted application, the application to access a secure storage, responsive to success by the trusted application in verifying the digital fingerprint;
   wherein the generating of the digital fingerprint comprises:
   reading, by the authentication agent, code data of a code area using a process identifier of the application received from the application.

2. The method of claim 1, further comprising:
   hashing the code data based on a hash algorithm.

3. The method of claim 2, further comprising:
   adding a timestamp to the hashed code data.

4. The method of claim 1, further comprising:
   encrypting the code data based on an encryption algorithm.

5. The method of claim 1, further comprising:
   generating a message authentication code (MAC) corresponding to the digital fingerprint.

6. The method of claim 5, wherein the MAC is generated based on a MAC chaining scheme.

7. The method of claim 1, further comprising:
   receiving, by the trusted application, the digital fingerprint.

8. The method of claim 7, wherein the digital fingerprint comprises encrypted code data and a message authentication code (MAC), corresponding to the application,
   the method further comprising,
   verifying, by the trusted application, the MAC included in the digital fingerprint.

9. The method of claim 7, wherein the digital fingerprint comprises encrypted code data and a MAC, corresponding to the application,
   the method further comprising,
   decrypting, by the trusted application, the encrypted code data based on an encryption algorithm.

10. The method of claim 9, further comprising:
    enrolling the decrypted code data in the secure storage.

11. The method of claim 9, wherein the decrypted code data comprises a timestamp,
    the method further comprising,
    verifying, by the trusted application, the timestamp.

12. The method of claim 1,
    wherein the driver in the normal operating system is a TrustZone driver.

13. A method for operating an electronic device, the method comprising:
    transmitting, by an application on a rich execution environment (REE) associated with a normal operating system for managing program execution thereon, a request to access a secure storage to an authentication agent;
    generating, by the authentication agent on the REE, a digital fingerprint of the application;
    checking, by a driver in the normal operating system, integrity of the authentication agent;
    transmitting, by the authentication agent, the digital fingerprint of the application to a trusted application on a trusted execution environment (TEE), which is associated with a secure operating system for managing program execution thereon;
    verifying, by the trusted application, the digital fingerprint of the application; and
    accessing, by the trusted application, the secure storage based on the request to access the secure storage, responsive to success by the trusted application in verifying the digital fingerprint of the application;
    wherein the generating of the digital fingerprint comprises:
    reading, by the authentication agent, code data of a code area using a process identifier of the application received from the application.

14. The method of claim 13, further comprising:
    checking, by the trusted application, the integrity of the authentication agent;
    wherein verifying the digital fingerprint of the application comprises verifying, by the trusted application, the digital fingerprint of the application based on the integrity of the authentication agent.

15. A method for operating an electronic device, the method comprising:
    receiving, at a trusted application program executing in a trusted execution environment (TEE) of a processor, which is associated with a secure operating system for managing program execution thereon, a digital fingerprint corresponding to code of an application program from an authentication agent program, the application program and the authentication agent program executing on a rich execution environment (REE) associated with a normal operating system for managing program execution thereon, the normal operating system associated with the REE comprising a driver that is configured to check integrity of the authentication agent program;

authenticating, by the trusted application program, the application program based on a comparison of the digital fingerprint thereof with a plurality of enrolled digital fingerprints associated with a secure storage medium; and permitting, by the trusted application program, access to the secure storage medium responsive to the authenticating of the application program based on the digital fingerprint thereof;

wherein the digital fingerprint is generated based on code data of a code area that is read using a process identifier of the application provided by the application.

16. The method of claim 15, further comprising the following prior to the authenticating of the application program:

transmitting, by the trusted application program, a request for verification of the authentication agent program;

receiving, at the trusted application program, a digital fingerprint of the authentication agent program generated by the driver responsive to the transmitting of the request; and verifying the integrity of the authentication agent program based on a comparison of the digital fingerprint thereof with the enrolled digital fingerprints.

17. The method of claim 16, further comprising:
registering the digital fingerprint of the application program among the enrolled digital fingerprints responsive to the verifying the integrity of the authentication agent program.

18. The method of claim 16, wherein the driver of the normal operating system associated with the REE is a TrustZone driver.

19. The method of claim 18, wherein an encryption key for accessing the secure storage medium is managed by the secure operating system associated with the TEE.

20. The method of claim 19, wherein:
the application program comprises a secure boot program, and wherein the secure storage medium comprises a secure boot code stored therein;
the secure storage medium comprises part of a communications network, and wherein the access to the secure storage medium comprises wireless access; or
the secure storage medium is associated with an Internet-of-Things (IoT) device.

* * * * *